United States Patent [19]
Yardley et al.

[11] 3,972,973
[45] Aug. 3, 1976

[54] METHOD OF MAKING RUBBER AND POLYESTER STRUCTURES

[75] Inventors: James Frank Yardley, Lichfield; Reginald Trevor Wragg, Tamworth, both of England

[73] Assignee: Dunlop Limited, London, England

[22] Filed: Aug. 19, 1974

[21] Appl. No.: 498,427

[30] Foreign Application Priority Data
Sept. 22, 1973  United Kingdom............... 44540/73
Aug. 29, 1973  United Kingdom............... 40755/73
Aug. 9, 1974   United Kingdom............... 35136/74

[52] U.S. Cl................................. 264/265; 156/308; 264/328; 264/340
[51] Int. Cl.$^2$...................... B29H 9/00; B29F 1/00
[58] Field of Search .......... 156/316, 308, 306, 307; 264/265, 328, 248, 232, 340, 259, 234, 329; 428/480, 483, 492; 427/322, 299

[56] References Cited
UNITED STATES PATENTS

| | | | |
|---|---|---|---|
| 3,080,255 | 3/1963 | Winkelman........................ | 428/480 |
| 3,248,370 | 4/1966 | Reischl et al.................... | 260/75 NP |
| 3,852,005 | 12/1974 | Sculati et al....................... | 264/244 |
| 3,875,118 | 4/1975 | Meisert et al.................... | 260/75 NP |

OTHER PUBLICATIONS
Dombrow, Polyurethanes, Reinhold, N.Y. (1965) pp. 156–158 relied on.

*Primary Examiner*—Willard E. Hoag
*Attorney, Agent, or Firm*—Stevens, Davis, Miller & Mosher

[57] ABSTRACT

A composite structure comprises an unsaturated hydrocarbon rubber, polychloroprene or a chloroprene/hydrocarbon copolymer bonded without an adhesive layer to a polymer being a reaction product of at least one aliphatic dihydric alcohol and at least one aromatic compound having two acidic groups attached to the aromatic nucleus, or to an elastoplastic linear block copolymer having at least one block of this reaction product.

A method of making this structure comprises treating the rubber surface to be bonded with concentrated nitric acid, hypochlorous acid or a hypochlorous acid generator, melting at least the surface of the polymer to be bonded, and solidifying the polymer in contact with the rubber.

The invention provides a polyester/rubber structure conveniently without an adhesive interlayer and the structure is useful in applications requiring properties of polyesters and rubbers, for example belting, hose and tires.

15 Claims, No Drawings

METHOD OF MAKING RUBBER AND POLYESTER STRUCTURES

This invention relates to composite structures and in particular to composite structures of unsaturated rubbers and ester-based polymers and to a method of making such structures.

It has been proposed to bond an epichlorhydrin rubber to an ester-based polymer by melting at least the surface of the ester-based polymer to be bonded to the rubber and solidifying the polymer in contact with the rubber. We have now found that it is possible to bond certain ester-based polymers to certain non-polar unsaturated rubbers by this method provided that the rubber surface is subjected to a certain pre-treatment.

According to the present invention there is provided a composite structure of:

1. an unsaturated rubber selected from unsaturated hydrocarbon rubbers, polychloroprene and copolymers of chloroprene with at least one copolymerizable hydrocarbon, and
2. an ester-based polymer selected from (A) reaction products of at least one aliphatic dihydric alcohol and at least one aromatic compound having two acidic groups attached to the aromatic nucleus, one being a carbonyl-containing acidic group and the other being a carbonyl-containing acidic group or an acidic hydroxyl group, and (B) elastoplastic linear block copolymers having at least one block of a reaction product defined in (A), the rubber being bonded directly to the ester-based polymer without an adhesive interlayer.

According to the present invention also, a method of making a composite structure defined in the immediately preceding paragraph comprises (i) treating the surface of the rubber to be bonded to the ester-based polymer with a treatment agent selected from concentrated nitric acid, hypochlorous acid and hypochlorous acid generators, (ii) heating the ester-based polymer to melt at least the surface to be bonded to the rubber, and (iii) solidifying the molten ester-based polymer in contact with the treated rubber.

The treatment time should be sufficient to modify the rubber surface without undesirably degrading the bulk of the rubber, and any residual treatment agent remaining at the end of the treatment should be removed if its presence would undesirably affect the rubber or the ester-based polymer. The treatment agent is a modifying agent for the rubber surface and does not take the form of an adhesive composition or cement between the rubber and the polymer.

The treatment agent may be applied by any convenient means, for example by dipping, spraying or brushing, and the treatment is suitably performed at room temperature (about 15°–20°C). When the treatment agent is concentrated nitric acid this may be applied as a liquid or as a gel or paste with fine silica powder. Examples of treatment agents in the form of hypochlorous acid generators are acidified solutions of alkali metal hypochlorites, trichloroisocyanuric acid and alkali metal salts of mono- and di-chloroisocyanuric acid. The alkali metal is suitably sodium. The trichloroisocyanuric acid may be employed as a solution in ethyl acetate and the alkali metal chloroisocyanurates may be employed as aqueous solutions.

The rubber is usually in the vulcanized state in the composite structure. The rubber may be vulcanized in contact with the ester-based polymer, in which case the conditions of vulcanization may be sufficient to melt the polymer, or the rubber may be in the vulcanized state prior to contact with the polymer. The rubber may be peroxide-vulcanized but preferably it is vulcanized by a sulphur-based vulcanization system.

Although the treatment employed in this invention should improve the bond between the polymer and a rubber having any amount of unsaturation, it is preferred, in order to obtain a significant improvement for most practical purposes, that the rubber which is treated should have more than five carbon-carbon double bonds for every 100 main-chain carbon atoms and more preferably in excess of fifteen carbon-carbon double bonds for every 100 main-chain carbon atoms. When the rubber is a hydrocarbon rubber it may suitably be a linear polymer of a cyclic hydrocarbon monoene, for example cyclopentene which polymerises to poly-1,5-pentenamer, or a polymer of an aliphatic hydrocarbon diene. When the rubber is a copolymer of an aliphatic hydrocarbon diene, the comonomer(s) may be aliphatic and/or alkenyl-aromatic hydrocarbons. Examples of suitable aliphatic hydrocarbon diene rubbers are natural rubber, synthetic cis-polyisoprene, polybutadiene rubber, butadiene/styrene rubber and butadiene/alphamethylstyrene rubber. The rubbers referred to herein may be blended with each other and/or with one or more other rubbers, and are usually in compositions containing ingredients normally used in rubber compositions, for instance fillers, processing aids, anti-ageing agents and vulcanizing agents.

The ester-based polymer is normally thermoplastic before and after being bonded to the rubber by the method of this invention. It is desirable that the polymer should not be heated too far above its softening point (i.e., the temperature at which it becomes thermoplastically processible) which for these polymers is in the region of 200°C, because this may lead to loss of quality from thermal instability by, for example, pyrolysis or oxidative degradation.

The ester-based polymer may be the reaction product of at least one aliphatic dihydric alcohol and at least one aromatic compound having two acidic groups attached to the aromatic nucleus, one being a carbonyl-containing acid group, e.g. a carboxylic acid group (COOH), a carboxylic ester group (COOalkyl) or a carbonyl chloride group (COCl), and the other being a carbonyl-containing acid group or an acidic hydroxyl group (OH). These reaction products are generally long chain ester condensation polymers in which the carbonyl carbon atom of each ester group is in the polymer main chain and is attached directly to an aromatic nucleus. The reaction product is preferably a poly(alkylene terephthalate), a poly(alkylene isophthalate), an alkylene terephthalate/isophthalate copolymer or a poly(paraalkylenoxybenzoate). The alkylene groups, which are derived from the one or more dihydric alcohols, may have for instance from two to eight carbon atoms. Specific examples of suitable reaction products are poly(ethylene terephthalate), poly(butylene terephthalate), poly(1,4-dimethylenecyclohexane terephthalate) and 1,4-dimethylenecyclohexane terephthalate/isophthalate copolymers. Poly(tetramethylene terephthalate) results in a particularly strong bond when employed in the present invention.

Alternatively, the ester-based polymer may be an elastoplastic linear block copolymer having at least one block of a reaction product defined in the immediately preceding paragraph. A preferred block copolymer is one having (a) $n$ (where $n$ is a positive integer) substantially amorphous (in the unstretched state) blocks of a polyether e.g. polytetrahydrofuran or poly(trimethylene glycol), an aliphatic acid polyester e.g. poly(propylene adipate) or polycaprolactone, an olefin polymer e.g. ethylene/propylene copolymer, or two or more sub-blocks of one or more of these species interlinked by means of, for example, a diisocyanate in the case of hydroxyl-terminated species, and (b) $n + 1$ blocks of the aforementioned reaction product which will generally be crystalline. The molecular weight of each of these blocks may suitably be in the range 1,000 to 10,000.

A particularly preferred block copolymer is one having $n$ blocks of a polyether and $n + 1$ blocks of the aforementioned reaction product. The carbon to oxygen ratio in the repeating unit of the polyether block should preferably be greater than 2.5:1 and the melting point of the polyether should preferably be less than 55°C. Preferably the average molecular weight of the polyether should lie within the range 600 to 6,000. Preferred blocks of the aforementioned polyester reaction product are crystalline blocks having a melting point greater than 170°C and preferably from 30 to 60 per cent of the block copolymer is comprised of the polyester reaction product. Other preferred features of the polyester reaction product blocks are (i) from 50 to 90 per cent, especially from 65 to 85 per cent, of the ester units in each block are identical, (ii) a separate polymer of these identical units having a molecular weight of about 5,000 would have a melting point of about 174°C, and (iii) a separate polymer of a complete block having a molecular weight of about 5,000 would have a melting point of less than 200°C.

The bond between adjacent polyether and polyester blocks is suitably an ester-linkage produced by reaction of, for example, a hydroxyl-terminated polyether with a carboxyl-terminated polyester. The block copolymer may be prepared from a reaction mixture of (a) a polyether, aliphatic acid polyester or olefin polymer, having two terminal hydroxyl groups, and (b) the reactants from which the polyester reaction product is derived. For example, the block copolymer may be made by melt copolymerisation of poly(tetramethylene ether) diol, 1,4-butane diol, dimethyl terephthalate and dimethyl isophthalate, or alternatively by melt copolymerisation of poly(tetramethylene ether) diol, 1,3-propane diol, 1,4-butane diol and dimethyl terephthalate.

Preferred block copolymers are those available under the trade names Hytrel and Pelpren.

The ester-based polymer may be in a composition with ingredients normally present in ester-based polymer compositions, for example fillers, processing aids and antiageing agents.

In the method of this invention, the polymer may be melted by direct application of heat with or without an elevated pressure. Since the polymer is normally thermoplastic before and after bonding, solidification normally occurs by mere cooling. Preferred methods of applying the polymer to the rubber are by injection-moulding or transfer-moulding, but other techniques such as compression-moulding, rotational-moulding, extrusion, powder-spraying or fluidised-bed coating may be employed if desired.

The invention is illustrated in the following Examples.

EXAMPLE I

A rubber composition prepared from the following formulation was vulcanized for 40 minutes at 150°C in a mould measuring 4.0 × 76.2 × 228.6 mm.

| Formulation | Parts by weight |
|---|---|
| Natural rubber (SMR 10) | 100 |
| Carbon black (N330) | 49.15 |
| Mineral Oil | 5.0 |
| Zinc oxide | 5.0 |
| Stearic acid | 2.0 |
| Sulphur | 2.5 |
| N-cyclohexyl benzthiazole-2-sulphenamide | 0.5 |
| 4-isopropylamino-diphenylamine (Nonox ZA) | 0.15 |
| Condensation product of acetone and diphenylamine adsorbed on carbon black (Nonox BLB) | 1.70 |

The natural rubber had about 25 C=C per 100 main-chain carbon atoms.

One end of the slab of vulcanized rubber was immersed at a depth of 180 mm for five minutes in an acid hypochlorite solution consisting of:

| | |
|---|---|
| Water | 1000 ml |
| Concentrated hydrochloric acid | 5 ml |
| Aqueous sodium hypochlorite solution containing 12 weight/volume per cent of available chlorine | 30 ml |

The treated slab was allowed to dry and then placed in a plunger mould of the same dimensions. A sheet of a linear block copolymer containing 42% by weight polytetrahydrofuran and 58% by weight poly(butylene terephthalate), commercially available under the trade name Hytrel 4055, was compression moulded onto the 76.2 × 228.6 mm surface of the slab at 250°C until the plastic was molten, followed by cooling under a slight pressure (about 40 kg/cm²). No bond was produced between the block copolymer and the untreated rubber surface. The strength of the bond between the block copolymer and the hypochlorite-treated rubber surface was determined by a simple peel adhesion test at a jaw separation rate of 500 mm per minute. A bond strength of 147 Newtons per 20 mm wide test-piece was obtained with failure of the rubber.

EXAMPLE II

A rubber composition prepared from the formulation given in Example I was vulcanized for 55 minutes at 135°C in a mould measuring 2.5 × 76.2 × 228.6 mm. A slab measuring 2.5 × 76.2 × 30 mm was cut from the vulcanized composition and was immersed for 1 minute in an acid hypochlorite solution consisting of:

| | |
|---|---|
| Water | 1000 ml |
| Concentrated hydrochloric acid | 10 ml |
| Aqueous sodium hypochlorite solution containing 12 weight/volume per cent of available chlorine | 30 ml |

The treated slab was washed in water, allowed to dry and then placed in a mould measuring 7.0 × 76.2 × 30 mm. Poly(tetramethylene terephthalate), commercially available as Dereton TAP10, was injected into the mould from a Batenfeld ½ oz Type BSKM 15 HKF 4 injection-moulding machine under a pressure of 700 kg/cm$^2$ which was maintained for 12 seconds. The mould and injector nozzle were respectively at 140°C and 265°C. After cooling for a total time of 40 seconds the composite was de-moulded.

The strength of the bond between the rubber and the polyester was determined by peel adhesion at a jaw separation rate of 500 mm per minute. A bond strength of 216 Newtons per 30 mm wide test-piece was obtained with failure in the rubber phase.

EXAMPLE III

Example II was repeated using a rubber composition prepared from the formulation given below which was vulcanized for 40 minutes at 150°C.

|  | Parts by weight |
|---|---|
| Styrene/butadiene rubber (Intol 1502) | 100 |
| Carbon black (N330) | 48.75 |
| Mineral oil | 5.0 |
| Zinc oxide | 3.0 |
| Sulphur | 1.75 |
| Stearic acid | 1.0 |
| N-cyclohexyl benthiazole-2-sulphenamide | 1.0 |
| 4-isopropylamino-diphenylamine (Nonox ZA) | 0.15 |
| BLE 25 | 1.25 |

The rubber had about 19 C=C per 100 main-chain carbon atoms.

BLE is a high temperature reaction product of diphenylamine and acetone.

A bond strength of 235 Newtons per 30 mm wide test-piece was obtained with failure in the rubber phase.

EXAMPLE IV

A rubber composition prepared from the formulation given below was vulcanized for 40 minutes at 150°C in a mould measuring 2.5 × 76.2 × 228.6 mm.

|  | Parts by weight |
|---|---|
| Oil-extended styrene/butadiene rubber (Intol 1712) | 77.5 |
| Styrene/butadiene rubber (Intol 1502) | 22.5 |
| Carbon black (N339) | 59.0 |
| Aromatic oil (Dutrex RT) | 5.0 |
| Zinc oxide | 2.5 |
| Stearic acid | 1.0 |
| Mineral oil | 5.0 |
| 4-isopropylamino-diphenylamine (Nonox ZA) | 2.0 |
| BLE 25 | 2.0 |
| 40 mesh crumb natural rubber | 5.0 |
| N-nitroso-diphenylamine (Vulcatard A) | 0.4 |
| 2-Morpholinothio-benzthiazole (Santocure MOR) | 1.0 |
| Sulphur | 1.75 |

The rubbers had about 19 C=C per 100 main-chain carbon atoms.

A slab measuring 2.5 × 76.2 × 30 mm was cut from the vulcanized composition and was treated with the acid hypochlorite solution as described in Example II. The treated slab was washed with water, allowed to dry and then placed in a mould measuring 7.0 × 76.2 × 30 mm. A block copolymer containing 35.5% by weight polytetrahydrofuran and 64.5% by weight poly(butylene terephthalate), commercially available under the trade name Hytrel 5555, was injected into the mould at a pressure of 210 kg/cm$^2$ which was maintained for 12 seconds. The mould and injector nozzle were at 100°C and 260°C respectively. After cooling for a total time of 40 seconds, the composite was de-moulded.

The peel adhesion strength of the bond between the rubber and the block copolymer measured at a jaw separation rate of 500 mm per minute was 324 Newtons per 30 mm wide test-piece with failure of the rubber.

EXAMPLE V

Example IV was repeated except that the block copolymer was a copolymer of polytetrahydrofuran and poly(ethylene terephthalate), commercially available as Pelpren P70B, and the injector nozzle temperature was 250°C.

The peel adhesion bond strength was 274 Newtons per 30 mm wide test-piece with failure of the rubber.

EXAMPLE VI

A hypochlorite-treated vulcanized rubber composition was prepared as described in Example III. The treated slab was washed with water, allowed to dry and placed in a mould measuring 7.0 × 76.2 × 30 mm. A glass-reinforced poly(tetramethylene terephthalate) containing 20 weight per cent glass reinforcement and commercially available under the trade name Dereton TGA50 was injected into the mould at a pressure of 500 kg/cm$^2$ which was maintained for 12 seconds. The mould and injector nozzle temperatures were respectively at 100°C and 260°C. After cooling for a total time of 24 seconds the composite was de-moulded.

Failure occurred in the rubber upon testing of the bond strength.

EXAMPLE VII

A vulcanized rubber composition was prepared as described in Example II. A slab measuring 2.5 × 76.2 × 30 mm was cut from the vulcanized composition and was immersed in a saturated aqueous solution of sodium dichloroisocyanurate, available under the trade name Fi-clor 60S, for 15 minutes. The treated slab was washed with water, allowed to dry and placed in a mould measuring 7.0 × 76.2 × 30 mm. Poly(tetramethylene terephthalate), commercially available as Tenite 6PRO, was injected into the mould under a pressure of 700 kg/cm$^2$ which was maintained for 12 seconds. The mould and injector nozzle temperatures were 100°C and 260°C respectively. After cooling for a total time of 24 seconds the composite was de-moulded.

Upon testing the bond strength, failure occurred in the rubber.

EXAMPLE VIII

Example VII was repeated except that the vulcanized rubber slab was treated by painting the slab surface with a saturated ethyl acetate solution of trichloroisocyanuric acid, available under the trade name Fi-clor 91, and leaving it to dry at room temperature.

Failure occurred in the rubber upon testing the bond strength.

The same result was obtained when the treatment agent was applied by immersion in the Fi-clor 91 solution for 5 minutes followed by washing with water and drying.

EXAMPLE IX

Example VII was repeated except that the vulcanized rubber slab was treated by immersion in commercially available concentrated nitric acid for 30 seconds before washing with water and drying.

Failure occurred in the rubber on testing the bond strength.

Having now described our invention, what we claim is:

1. A method of making a composite structure of:
   1. a vulcanized unsaturated rubber selected from the group consisting of unsaturated hydrocarbon rubbers, polychloroprene and copolymers of chloroprene with at least one copolymerizable hydrocarbon, and
   2. a thermoplastic ester-based polymer selected from the group consisting of (A) reaction products of at least one aliphatic dihydric alcohol and at least one aromatic compound having two acidic groups attached to the aromatic nucleus, one being a carbonyl-containing acidic group or an acidic hydroxyl group, and (B) elastoplastic linear block copolymers having at least one block of a reaction product defined in (A), the vulcanized unsaturated rubber being bonded directly to the ester-based polymer without an adhesive interlayer, which comprises
      i. treating the surface of said vulcanized unsaturated rubber to be bonded to said thermoplastic ester-based polymer with a treatment agent solution selected from the group consisting of concentrated nitric acid, hypochlorous acid and hypochlorous acid generators,
      ii. heating said thermoplastic ester-based polymer to melt at least the surface to be bonded to said vulcanized unsaturated rubber, and
      iii. solidifying the molten thermoplastic ester-based polymer in contact with the treated vulcanized unsaturated rubber.

2. A method according to claim 1 in which the rubber has more than five carbon-carbon double bonds for every 100 main-chain carbon atoms.

3. A method according to claim 2 in which the rubber has more than 15 carbon-carbon double bonds for every 100 main-chain carbon atoms.

4. A method according to claim 1 in which the rubber is an unsaturated hydrocarbon rubber selected from the group consisting of linear polymers of cyclic hydrocarbon monoenes and polymers of aliphatic hydrocarbon dienes.

5. A method according to claim 1 in which the rubber is selected from the group consisting of natural rubber, synthetic cis-polyisoprene, polybutadiene rubber, poly-1,5-pentenamer, polychloroprene, butadiene/styrene rubber and butadiene/alpha-methylstyrene rubber.

6. A method according to claim 1 in which the ester-based polymer is selected from the group consisting of poly(ethylene terephthalate), poly(butylene terephthalate), poly(1,4-dimethylenecyclohexane terephthalate), 1,4-dimethylenecyclohexane terephthalate/isophthalate copolymer and elastoplastic linear block copolymers having at least one block of a polymer selected from these.

7. A method according to claim 1 in which the ester-based polymer is an elastoplastic linear block copolymer, from 30 to 60 per cent of which is comprised of at least one block of the reaction product (A).

8. A method according to claim 1 in which the treatment is performed at room temperature.

9. A method according to claim 1 in which the hypochlorous acid generator is selected from the group consisting of acidified alkali metal hypochlorites, trichloroisocyanuric acid, alkali metal salts of monochloroisocyanuric acid and alkali metal salts of dichloroisocyanuric acid.

10. A method according to claim 1 in which the ester-based polymer is applied to the rubber by injection-moulding or transfer-moulding.

11. A method according to claim 1 in which the ester-based polymer is selected from the group consisting of poly(alkylene terephthalate), poly(alkylene isophthalate), alkylene terephthalate/isophthalate copolymer, poly(paraalkylenoxybenzoate) and elastoplastic linear block copolymers having at least one block of a polymer selected from these.

12. A method according to claim 11 in which the alkylene groups have from 2 to 8 carbon atoms.

13. A method according to claim 1 in which the ester-based polymer is an elastoplastic linear block copolymer having:
    a. $n$ substantially amorphous (in the unstretched state) blocks selected from the group consisting of polyether, aliphatic acid polyester, olefin polymers and at least two interlinked sub-blocks of at least one of these polymers, and
    b. $n + 1$ crystalline blocks of the reaction product (A), where $n$ is a positive integer.

14. A method according to claim 13 in which the substantially amorphous blocks are of a polyether in which the carbon to oxygen ratio in the repeating unit of the polyether is greater than 2.5:1.

15. A method according to claim 14 in which the polyether is polytetrahydrofuran.

* * * * *